United States Patent
Aubry et al.

(10) Patent No.: US 9,688,559 B1
(45) Date of Patent: Jun. 27, 2017

(54) MULTISTAGE PROCESS FOR REMOVAL OF PHOSPHORUS, FLUORIDE, AND ARSENIC SPECIES FROM WATER VIA COMPLEXATION AND SOLUBILITY CONTROL

(71) Applicant: Pattison Sand Company, LLC, Clayton, IA (US)

(72) Inventors: David A. Aubry, Zephyrhills, FL (US); Daniel R. Matlick, Ames, IA (US)

(73) Assignee: Pattison Sand Company, Clayton, IA (US)

( * ) Notice: Subject to any disclaimer, the term of this patent is extended or adjusted under 35 U.S.C. 154(b) by 0 days.

(21) Appl. No.: 14/737,782

(22) Filed: Jun. 12, 2015

(51) Int. Cl.
| | |
|---|---|
| *C02F 1/52* | (2006.01) |
| *C02F 9/00* | (2006.01) |
| *C02F 1/66* | (2006.01) |
| C02F 101/10 | (2006.01) |
| C02F 101/14 | (2006.01) |
| C02F 103/00 | (2006.01) |
| C02F 103/32 | (2006.01) |
| C02F 103/34 | (2006.01) |
| C02F 103/10 | (2006.01) |

(52) U.S. Cl.
CPC .................. *C02F 9/00* (2013.01); *C02F 1/52* (2013.01); *C02F 1/66* (2013.01); C02F 2101/103 (2013.01); C02F 2101/105 (2013.01); *C02F 2101/14* (2013.01); *C02F 2103/007* (2013.01); *C02F 2103/10* (2013.01); *C02F 2103/32* (2013.01); *C02F 2103/34* (2013.01); *C02F 2209/06* (2013.01); *C02F 2301/08* (2013.01)

(58) Field of Classification Search
CPC ....................................................... C02F 1/52
See application file for complete search history.

(56) References Cited

U.S. PATENT DOCUMENTS 5,614,102 A * 3/1997 Sakurada ............... B01D 21/01
 210/718
2011/0247985 A1* 10/2011 Theodore ................. C02F 1/66
 210/720

* cited by examiner

*Primary Examiner* — Peter Keyworth
(74) *Attorney, Agent, or Firm* — Camille L. Urban; BrownWinick Law Firm

(57) ABSTRACT

The present invention relates in general to a process of removing phosphorus in various forms of suspended solids or dissolved ions, fluoride, and arsenic impurities from water streams in a multi-stage procedure via the use of additives, pH control, and physical separation, resulting in a water stream with <50 ppb phosphorus, <3 ppm fluoride, and <1 ppm arsenic.

13 Claims, No Drawings

MULTISTAGE PROCESS FOR REMOVAL OF PHOSPHORUS, FLUORIDE, AND ARSENIC SPECIES FROM WATER VIA COMPLEXATION AND SOLUBILITY CONTROL

BACKGROUND OF THE INVENTION

Field of Invention

The present invention relates in general to the process of cleaning water in lakes, ponds, rivers, streams, WWTPs, food processing plants, chemical plants, mining operations, and other sites and specifically in removing phosphorus, fluoride, and arsenic impurities from water streams through a multi-stage process via the use of additives, pH control, and physical separation, resulting in a water stream with lowered concentrations of water impurities, including achievement of levels of <50 ppb phosphorus, <3 ppm fluoride, and <1 ppm arsenic.

Water commonly contains soluble ions as impurities, resulting from natural processes such as dissolution of natural minerals and materials, and from human activities including agriculture, mining, manufacturing, chemical processing, and domestic and industrial water use. Dissolved ions are potentially disruptive to the normal steady-state of ecological systems and cause effects on systems that extend beyond the water systems themselves, as well as being undesirable for human use in potable water systems.

Efficient, economical means of removal of dissolved ions are sought to provide cleaner water for the sustainment of ecological systems and prevention of human activity-induced environmental changes, eutrophication, negative toxicological effects, as well as for further clean potable water use. There is no reported economically viable full-scale process by which <50 ppb phosphorus is attainable, nor attainable in combination with removal of fluoride and arsenic and other impurities.

Description of the Prior Art

There is no prior art that uses the specific control of the pH as a specified means of control of the process and utilizes a two-stage process with potentially different complexation agents in each stage, that effectively removes phosphorus (not exclusively phosphate, but organic, oligomeric, and ortho-phosphorus, suspended and dissolved), and also removes fluoride and arsenic. There is no prior art that achieves the level of removal to <50 ppb phosphorus as does the current invention. In addition and most critically, there is no prior art that bases the reagent addition on pH targets to maximize impurity removal via the insolubility of the formed complexes.

Prior art has included lime treatment of water for impurity removal, however, never in a multistage process, See for example, Zibrida, 4,657,680 and 4,698,163. The system in the present invention is more complex and effective in impurity removal in that it carefully first dissolves and subsequently forms complexes, followed by specific pH adjustments to cause precipitation of the formed complexes. In addition, multiple stages using different reagents facilitate increased impurity removal in the present invention.

Arsenic and fluoride have previously been removed using aluminum solution, free cationic calcium, and flocculent polymer; however, at a pH of 5-8, and utilizing a membrane filter rather than a solids-liquids separation, See for example, Krulik, 6,613,230. This process and pH range will not afford the selective precipitation provided by the present invention, and the present invention provides multiple stages of complexation and tailored pH-adjustment to remove impurities based on their insolubility at the target pH levels to achieve heretofore unprecedented amounts of impurities removal.

Aluminum and flocculents were reportedly employed in a two-step removal process, however, the first step was the addition of a complexation reagent, and the second step involved a flocculation, See for example, Song, Application No. 0168325, whereas in the present invention, the stages are each comprised of the addition of reagent, pH adjustment, and a solids-liquid separation at tightly controlled pH ranges to control stoichiometry and solubility.

Use of inorganic reagents in a multi-step process along with solids/liquids separation in the prior art has precedent, See for example, Jean-Boussely, 5,759,401, however, such process differs significantly form the present invention in that it did not monitor and control pH as the key indicator or factor in maximizing the formation of complexes of additive reagents and impurities and subsequently maximizing the insolubility of these formed complexes via pH control as a means by which to remove them via solids-liquid separation.

Fluoride has been removed using inorganic reagents, however, not through the use of controlled pH adjustment to maximize the insolubility of the formed complexes as included in the present invention, See for example, Lee, 6,210,589.

There is prior art disclosing the use of lime to precipitate phosphate; however, the reported pH utilized was lower (9 to 10) than in the present invention, See for example, Bennett, 4,402,833. The present invention is based on empirical evidence that the optimal pH for insolubility of calcium complexes occurs at a pH greater than 10.2, and utilizes the higher pH in combination with flocculent to increase impurity removal. In addition, in the present invention, an additional stage, not based on lime at an alkaline pH, but rather on aluminum at a neutral pH, is used to achieve previously unprecedented levels of impurity removal.

SUMMARY OF THE INVENTION

The present invention involves a two-stage process for removing phosphorus, fluoride, arsenic and other impurities from water. The first stage of the process involves the adjustment of the water initially to a neutral pH of 6 to 8, and a subsequent adjustment to a pH greater than 10.2, preferably 10.2 to 10.5, with a base that is preferably calcium hydroxide or other hydroxide. This is followed by the addition of a common commercially available coagulant or flocculent, usually at a concentration of less than 10 ppm. Subsequently, solid/liquid separation is accomplished using conventional technology such as decantation, filtration, or centrifugation, resulting in a wet solid product containing removed impurities at a partially cleaned effluent of a pH greater than 10.2.

The effluent from stage 1 is then pumped or otherwise transferred to the second stage wherein the pH of the water is adjusted to pH less than 6.2, preferably to between 4.0 and 6.2, even more preferably to pH 5.5 to 6.0, through the use of an aluminum-containing solution, such as alum or polyaluminum chloride, with or without an additional mineral acid or low molecular weight organic acid. Aluminum solutions include solutions of polyaluminum chloride, sodium aluminate, alum, aluminum chlorohydrate, or any soluble Al(III) species solution, although in this application, preferably those described as polyaluminum chloride.

The water is then raised to a pH greater than 7, preferably to a pH of 7.0 to 7.5, with a base, preferably lime or other hydroxide and then a commercially available coagulant or flocculent is added, usually at a concentration less than 10 ppm. Such addition is then followed by a solid/liquid separation using conventional technology such as decantation, filtration, or centrifugation, resulting in a wet solid product containing removed impurities and a cleaned effluent at a neutral pH.

Stage 1 or Stage 2 may be repeated; for example Stage 1 followed by Stage 1 or alternatively Stage 2 followed by Stage 2. Stages 1 or 2 may be used independently or as stand-alone treatments to provide some removal of impurities.

Stages 1 and 2 can be performed in any combination of sequences; for example Stage 2 followed by Stage 2 and Stage 1.

Stages 1 and 2 performed in sequence provide impurity removal regardless of initial concentration and regardless of initial impurity concentration and provide final effluent concentrations of less than 50 ppb phosphorus, less than 3 ppm fluoride and less than 1 ppm arsenic.

DETAILED DESCRIPTION OF THE PREFERRED EMBODIMENTS

Water containing impurities that are desired to be removed, specifically phosphorus, fluoride, and arsenic, can be treated by a two-stage process of the present invention. The phosphorus to be removed can be in any form-including organic phosphorus and oligomerized phosphorus ("total phosphorus") as well as oxidized anionic inorganic phosphorus ("ortho-phosphorus").

The first stage of the disclosed process is a pH adjustment of the water to a neutral pH of 6 to 8 using dilute mineral acid, low molecular weight organic acid, preferably 5% hydrochloric acid, or a dilute base, preferably lime as a solution of concentration 1 to 20% by mass.

Subsequently, the water pH is adjusted with a base, preferably lime or a similar component to above a pH of 10.2, where the solubility of calcium-anion complexes is low. The water is allowed to equilibrate, and a commercial coagulant or flocculent is then added to facilitate solids collection. The solids are then removed from the water via a solids-liquid separation, and the effluent is carried through to the next stage.

The second stage of the invention involves pumping or otherwise transferring the effluent from Stage 1 to Stage 2 and then lowering the pH of the water with an aluminum solution such as alum or polyaluminum chloride, to a pH in a range 4.0 to 6.2 and preferably 5.5 to 6.0. At this pH level, any produced solids from the Al solution addition are dissolved. The water is allowed to reach equilibrium, and the pH is then adjusted by the addition of slaked lime solution or other hydroxide salt to a pH level greater than 7, with a range of approximately 7.0 to 8.0 and preferably 7.0 to 7.5, where the solubility of the Al complexes with the remaining dissolved anions is low. Then a commercially available coagulant or flocculent is added, causing a formation of precipitate. The solids are then removed via a solids-liquids separation, and the effluent contains <50 ppb phosphorus, <3 ppm fluoride, and <1 ppm arsenic.

It should be noted that in carrying out the steps of the invention that all adjustments of pH and additions of coagulant and flocculent are preferably made via direct in-line injection or added to a continuously stirred vessel.

Example 1—Phosphorus Removal From a Municipal Water Influent Stream

A 10000 gallon decanter of water having a neutral pH between 6-8 and a slow mechanical agitation is treated with a freshly slaked lime solution at a 20% concentration until the water has a pH of approximately 10.4. A flocculent comprised of organic polymer at 0.1% concentration is added to the water with continued slow agitation. The precipitate gravity collects; the decantate is removed via gravity overflow into a second holdup tank, where a solution of 5% concentration alum is added with a slow agitation until the water achieves a pH of 5.2. The water is then charged with a 20% concentration freshly slaked lime solution until the achievement of a pH of 7.0. Subsequently a flocculent comprised of organic polymer at 0.1% concentration is added with continued slow agitation. The precipitate gravity collects; the decantate is removed via gravity overflow and contains <50 ppb phosphorus.

Example 2—Phosphorus Removal From A Man Made Containment of Water

A freshly slaked lime solution at a 10% concentration is injected into a pumped line having a pressure head above gravity flow pressure and a flow rate of approximately 500 gallons per minute to produce a solution having a pH of approximately 10.4, followed by the addition of a flocculent comprised of organic polymer at a 0.1% concentration. The stream is then pumped into a baffled rolloff box with a continuously rolling auger to remove settled solids for disposal and the decantate from the rolloff box is pressure transferred via pipe while a 5% concentration solution of alum is added to the solution to lower the pH to 5.2. After achievement of such pH level, a freshly slaked lime of 10% concentration is added to raise the pH of the solution to 7.0, and a flocculent comprised of preferably organic polymer at 0.1% concentration is added. The solution is then passed through a baffled rolloff box with a continuously rolling auger to remove settled solids for disposal. The resulting effluent contains <50 ppb phosphorus.

Example 3—Phosphorus, Phosphate, and Fluoride Removal From A Pond

A freshly slaked lime solution at a 10% concentration is injected into a pumped line having a pressure head above gravity flow pressure and a flow rate of 500 gallons per minute to produce a solution having a pH of approximately 10.4, followed by the addition of a flocculent comprised of organic polymer at a 0.1% concentration. The solution is pumped into a baffled container with a bottom-fixed continuously rolling auger to remove settled solids, which are forced as a slurry to a geotextile bag to dewater. The decantate from the baffled separator is pressure transferred via a pipe while a 5% concentration solution of alum is added to lower the pH to 5.4. After achievement of such pH, freshly slaked lime of a 20% concentration is added to raise the pH to 7.2, and a flocculent comprised of organic polymer at a 0.1% concentration is added. The solution is then passed through a second baffled container with a bottom-fixed continuously rolling auger to remove settled solids. The resulting effluent contains <50 ppb phosphorus and <3 ppm fluoride.

Example 4—Phosphorus, Phosphate, Fluoride, and Arsenic Removal From A Lake

A freshly slaked lime solution at 10% concentration is injected into a pumped line having a pressure head above gravity flow pressure and a flow rate of 500 gallons per minute to produce a solution having a pH of approximately 10.4, followed by the addition of a flocculent comprised of organic polymer at 0.1% concentration. The stream is pumped into a 5000 gallon holdup tank feeding a horizontal centrifugal decanter, whereby the solids are removed and the decantate is pressure transferred via a pipe while a 5% concentration solution of alum is added to lower the pH to 5.2. After achievement of such pH, a freshly slaked lime of 10% concentration is added to raise the pH to 7.2, and a flocculent comprised of organic polymer at 0.1% concentration is added. The solution is then fed to a horizontal centrifugal decanter, removing the solids as a slurry that is treated separately and decantate containing <50 ppb phosphorus, <3 ppm fluoride, and <1 ppm arsenic.

Example 5—Phosphate Removal From a Municipal Water Influent Stream

A sidestream of municipal wastewater plant effluent containing 1 ppm phosphorus is treated with a 20% polyaluminum chloride solution via direct injection to a 1 GPM stream in a pipe to adjustment of the stream to pH 5.8. A slaked lime solution at a 10% concentration is direct-injected into the stream and through a static mixer to achievement of pH 7.2. A flocculent comprised of organic polymer at 0.1% concentration is added to the stream via direct injection. The stream empties into a tank, with holdup time 30 minutes, and the precipitate gravity collects. The solid slurry is pumped to a porous geotextile bag for further dewatering of the solids and the water returned to the influent of the process. The decantate is removed via gravity overflow at the rate of input (approximately 1 GPM) into a second holdup tank, treated with a 20% polyaluminum chloride solution via direct injection to a 1 GPM stream in a pipe to adjustment of the stream to pH 5.8. A slaked lime solution at a 10% concentration is direct-injected into the stream and through a static mixer to achievement of pH 7.2. A flocculent comprised of organic polymer at 0.1% concentration is added to the stream via direct injection. The stream empties into a tank, with holdup time 30 minutes, and the precipitate gravity collects. The solid slurry is pumped to a porous geotextile bag for further dewatering of the solids and the water returned to the influent of the process. The decantate is removed via gravity overflow at the rate of input (approximately 1 GPM) and contains <50 ppb phosphorus.

What is claimed is:

1. A multi-stage process for removing phosphorus, fluoride, arsenic, and other impurities from an influent solution, wherein said process includes:
a first stage that comprises adjusting an influent solution to pH between approximately 6.0 to 8.0, followed by adjusting to a pH between 10.2 to 10.5 by the use of a base, and adding a flocculent to less than 100 ppm, followed by a solid/liquid separation resulting in ft removal of at least a portion of the impurities in the solids phase leaving a partially cleaned effluent having pH of at least 10.2; and a second stage in which the pH of the partially cleaned effluent is lowered to less than 6.2, adding a hydroxide to the partially cleaned effluent to increase the pH of the partially cleaned effluent to at least 7.0, and then adding a flocculent to the partially cleaned effluent followed by a removal of solids comprising impurities from the partially cleaned effluent leaving the partially cleaned effluent of at least pH 7 without the impurities comprised by the removed solids.

2. The multi-stage process as recited in claim 1 wherein the first stage adjustment of the pH of the influent solution comprises one or more of a dilute mineral acid, low molecular weight organic acid, and a dilute base.

3. The multi-stage process as described in claim 2 wherein said mineral acid is 5% hydrochloric acid.

4. The multi-stage process as described in claim 2 wherein said influent solution is adjusted to a neutral pH using said dilute base, comprising lime as a solution of concentration 1 to 20% by mass.

5. The multi-stage process as described in claim 1 wherein, said base comprises at least one of: lime and a hydroxide as a solution of concentration 1 to 20% by mass and lime as a solution of 5 to 10% concentration or dolomitic lime as a solution of 5 to 10% concentration with the addition thereof via one of direct in-line injection, and addition to a continuously stirred vessel.

6. The multi-stage process as described in claim 5 wherein subsequent to the adjustment of the pH of the influent solution said flocculent is added to the solution at concentrations less than 10 ppm.

7. The multi-stage process as described in claim 6 wherein subsequent to the addition of the flocculent, solid/liquid separation using at least one of decantation, filtration and centrifugation results in said solids and the substantially cleaned effluent.

8. The multi-stage process as described in claim 1 wherein the pH of the partially cleaned effluent is lowered to less than 6.2 by adding an aluminum-containing solution, comprising at least one selected from the following group: alum, polyaluminum chloride, sodium aluminate, aluminum chlorohydrate, and any soluble Al(III) species solution.

9. The multi-stage process as described in claim 8 wherein following the lowering of the pH of the partially cleaned effluent to less than 6.2, the pH is adjusted to approximately 7.0 to 8.0 with a base, selected from a group comprising: lime solution and any hydroxide.

10. The multi-stage process as described in claim 9 wherein following the adjustment of the pH to approximately 7.0 to 8.0, one of a coagulant and a flocculent is added to the partially cleaned effluent.

11. The multi-stage process as described in claim 10 wherein following the addition of the coagulant or flocculent, a solid/liquid separation is performed using conventional technology such as decantation, filtration or centrifugation to remove solids and thereby produce a cleaned effluent comprising less than 50 ppb phosphorus, less than 3 ppm fluoride and less than 1 ppm arsenic.

12. The multi-stage process as described in claim 1 wherein said adjustments of pH and said additions of coagulant or flocculent are made by one of the following methods: through a direct in-line injection and added to a continuously stirred vessel.

13. The multi-stage process as described in claim 1 wherein either of said first stage and said second stage may be repeated to provide removal of solids to required levels.

* * * * *